United States Patent [19]
Ember

[11] 3,928,457

[45] Dec. 23, 1975

[54] ACID CATALYZED, LIQUID PHASE PREPARATION OF METHYL VINYL KETONE

[75] Inventor: George Ember, Hackensack, N.J.

[73] Assignee: Hoffmann-La Roche Inc., Nutley, N.J.

[22] Filed: Aug. 31, 1973

[21] Appl. No.: 393,519

Related U.S. Application Data

[63] Continuation-in-part of Ser. No. 296,407, Oct. 10, 1972, abandoned.

[52] U.S. Cl. ............................................. 260/593 R
[51] Int. Cl.$^2$ ........................................ C07C 49/20
[58] Field of Search ............................... 260/593 R

[56] References Cited
OTHER PUBLICATIONS

Nielsen, The Aldol Condensation, Organic Reactions, Vol. 16, pp. 9–10 and 28–30.

Wesslen et al., Acta Chemica Scandinavica 22(1968), pp. 2085–2100.

Nielson, "The Aldol Condensation," Organic Reactions, Vol. 16, pp. 9 to 11.

Primary Examiner—James O. Thomas, Jr.
Assistant Examiner—James H. Reamer
Attorney, Agent, or Firm—Samuel L. Welt; Jon S. Saxe; Richard A. Gaither

[57] ABSTRACT

A process for obtaining methyl vinyl ketone by reacting acetone with formaldehyde in the presence of a strong acid in the liquid phase.

5 Claims, No Drawings

3,928,457

ACID CATALYZED, LIQUID PHASE PREPARATION OF METHYL VINYL KETONE

CROSS REFERENCE TO RELATED APPLICATIONS

This is a continuation-in-part of patent application Ser. No. 296,407, filed Oct. 10, 1972 now abandoned, entitled "Acid Catalyzed, Liquid Phase Preparation of Methyl Vinyl Ketone".

BACKGROUND OF THE INVENTION

This invention relates to the liquid phase production of methyl vinyl ketone from formaldehyde and acetone.

$\alpha,\beta$-unsaturated ketones have heretofore been obtained by reacting a ketone with formaldehyde at elevated temperatures in the presence of a solid catalyst. Among the liquid phase and vapor phase processes which utilize solid catalysts for making $\alpha,\beta$-unsaturated ketones are the processes described in British Pat. No. 993,389, German Pat. No. 734,278 and U.S. Pat. Nos. 3,578,702, 2,451,351 and 2,245,567.

These processes have been found, however, to be generally uneconomical for producing methyl vinyl ketone. The activity of the solid catalysts utilized in these processes has tended to be very short lived. This has been due to the tendency of formaldehyde and methyl vinyl ketone to polymerize on the surface of the catalyst at the elevated temperatures utilized. As a consequence, such solid catalysts have required frequent replacement and/or regeneration. The need to frequently replace and/or regenerate the solid catalyst has typically involved great expense and inconvenience, making the processes which utilize solid catalyst quite impractical for producing methyl vinyl ketone.

SUMMARY OF THE INVENTION

In accordance with the process of this invention, methyl vinyl ketone is obtained by reacting formaldehyde with acetone in the presence of a strong acid in the liquid phase.

By this liquid phase process, the problems attending frequent and costly solid catalyst replacement are avoided.

DETAILED DESCRIPTION OF THE INVENTION

By the process of this invention, methyl vinyl ketone is obtained by reacting acetone with formaldehyde in the presence of a strong acid in the liquid phase. By the use of the term "in the liquid phase" is meant that, under the reaction condition utilized, the strong acid, the acetone, and the formaldehyde form a liquid phase, substantially free of a solid or gaseous phase.

The liquid phase process of this invention can be carried out continuously or batchwise in either a homogeneous system containing only one liquid phase or a heterogeneous system containing two or more liquid phases. In a homogeneous system, the acid, formaldehyde and acetone form a single, homogeneous liquid phase. In a heterogeneous system, the phases are separate and are intimately mixed in a conventional manner, such as by rapidly agitating the phases.

As an example of a heterogeneous system, in accordance with this invention, is a two phase liquid system wherein one phase consists of aqueous formaldehyde, strong acid and acetone and the second phase consists of methyl vinyl ketone and an inert solvent, which is immiscible with water and which extracts the methyl vinyl ketone from the aqueous phase as it is formed by the process of this invention. In this system, any conventional, slightly polar, inert organic solvent which is substantially immiscible with water and which will strip the methyl vinyl ketone from the reaction mixture as it is formed can be utilized. Preferred inert organic solvents include the chlorinated hydrocarbons, particularly tetrachloroethane, trichloroethylene and chlorobenzene.

In carrying out the liquid phase process of this invention, any conventional strong acid having a dissociation constant (in water at 25°C.) of greater than about $10^{-4}$ can be utilized. Among the preferred strong acids which can be utilized are the inorganic acids such as sulfuric, hydrochloric, perchloric, hydrobromic, hydroiodic, and phosphoric acid. Also among the preferred strong acids are the strong organic acids such as formic acid, oxalic acid, trichloroacetic acid and the sulfonic acids. The preferred sulfonic acids include the aliphatic sulfonic acids, especially the lower alkyl sulfonic acids, such as methanesulfonic acid, ethanesulfonic acid, 1-propanesulfonic acid, 2-propanesulfonic acid, and trifluoromethanesulfonic acid, particularly methanesulfonic acid; the alicyclic sulfonic acids, such as camphorsulfonic acid; and the aromatic sulfonic acids such as the toluene-sulfonic acids, particularly p-toluenesulfonic acid, the napthalenesulfonic acids, particularly naphtalene-1-sulfonic acid and naphtalene-2-sulfonic acid, benzenesulfonic acid, the nitrophenylsulfonic acids, particularly p-nitrophenylsulfonic acid, and the chlorobenzenesulfonic acids, particularly 4-chlorobenzenesulfonic acid. Among the foregoing strong acids, especially preferred for use in the process of this invention are the relatively inexpensive, strong inorganic acids such as sulfuric acid and phosphoric acid and the relatively non-corrosive, strong organic acids such as p-toluenesulfonic acid.

In the process of this invention, the reaction mixture, which consists of the acetone, formaldehyde and strong acid, can also contain various inert diluents. Among the inert diluents which can be present in the reaction mixture are methanol and water. These diluents can be present in trace or larger amounts without affecting the reaction, the concentration of the inert diluents not being critical in the process of this invention. Usually, between about ½ and 2 parts by weight of water and about 0.2 to 0.3 parts by weight of methanol are present in the reaction mixture for each part of formaldehyde added thereto. However, the concentration of water and of methanol in the reaction mixture can be higher or lower in accordance with the process of this invention, and the exact concentration of the inert diluents is not part of this invention.

In carrying out this liquid phase process, the ratio of formaldehyde to acetone in the reaction mixture is not critical, and equal parts by weight of these reactants can be utilized to obtain methyl vinyl ketone. It is preferred however, that an excess of acetone be utilized so that virtually all of the formaldehyde will be consumed in the reaction. Accordingly, it is preferred that a ratio of at least about 5 parts by weight of acetone per part by weight of formaldehyde be utilized. It is especially preferred to utilize between about 12 and 20 parts by weight of acetone per part by weight of formaldehyde with about 16 parts by weight of acetone per part by weight of formaldehyde being particularly preferred.

In this process, the amount of strong acid utilized to catalyze the reaction is not critical, and the acid can comprise between about 0.005 and 2.0 percent by weight of the reaction mixture. It is especially preferred that the acid be present in an amount between about 0.01 and 0.50 percent by weight of the reaction mixture. A particularly preferred amount of strong inorganic acid is between about 0.05 and 0.10 percent by weight and a particularly preferred amount of strong organic acid is between about 0.01 and 0.02 percent by weight.

In carrying out the process of this invention, temperature and pressure are not critical, and any combination of temperature and pressure conditions whereby the reaction mixture is maintained in the liquid phase, substantially free of a solid or a gaseous phase, can be utilized. In this process, temperatures of about 100°C. to about 300°C. are preferred, with 150°C. to 250°C. being particularly preferred. In this process, any pressure at or above the vapor pressure of the reaction mixture at the temperature of the reaction mixture can be utilized to keep the reaction mixture in the liquid phase. Under the preferred conditions of the process of this invention, pressures of about 300 p.s.i.a. to about 1000 p.s.i.a. are generally utilized. However, in this process, greater pressures can also be utilized, such as a pressure of up to approximately 7000 p.s.i.a., as well as lower pressures of down to approximately 100 p.s.i.a.

By the liquid phase process of this invention, yields of up to about 82% methyl vinyl ketone, based on formaldehyde, can be expeditiously obtained with virtually complete consumption of formaldehyde. In addition, the reaction rate of this process is relatively high at 100°C. to 300°C., resulting in relatively large outputs of methyl vinyl ketone with conventional, liquid phase processing equipment.

The methyl vinyl ketone produced by the process of this invention can be suitably isolated from the reaction mixture in a conventional manner. It can be isolated, for example, by fractional distillation of the reaction mixture which results when the process of this invention is carried out in a homogeneous system, i.e., with one liquid phase.

The acid used to catalyze the process can, if desired, be recovered and reused or else discarded. However, since the strong acids utilized, particularly the inorganic acids, are generally quite inexpensive, it is preferred to use fresh acid as the catalyst in this process and not to recycle the used acid.

The examples which follow illustrate the process of this invention.

EXAMPLE 1

A mixture of 42.3 g of aqueous formaldehyde solution (about 36 wt.% formaldehyde in water and methanol) and 257.8 g. of acetone was prepared. Then, 3.15 g. of aqueous sulfuric acid solution (18 wt.% $H_2SO_4$) was added. A portion of this reaction mixture was charged into a pressure bomb. The reaction mixture was analyzed by gas chromatography to determine the exact composition of the charge to the bomb. The bomb, containing the charge, was immersed in an oil bath heated to 203°C. After 8 minutes, the bomb was quenched. The effluent from the bomb was analyzed by gas chromatography. The results are summarized below in Table 1.

Table 1

| (wt.%) | Formaldehyde | Water | Methanol | Acetone | Methyl vinyl Ketone |
|---|---|---|---|---|---|
| Charge: | 5.0 | 7.82 | 1.87 | 85.29 | — |
| Effluent: | 0.06 | 12.41 | 1.75 | 76.72 | 9.03 |

EXAMPLE 2

Utilizing the procedure of Example 1, a mixture of 35 g. of the formaldehyde solution, 210 g. of acetone, 1.63 ml. of water, and 0.17 ml. of phosphoric acid 85 wt.% $H_3PO_4$) was prepared and part of this mixture was charged into a pressure bomb. The bomb was immersed for 20 minutes in a 200°C. oil bath. The results are summarized below in Table 2.

Table 2

| (wt.%) | Formaldehyde | Water | Methanol | Acetone | Methyl vinyl Ketone |
|---|---|---|---|---|---|
| Charge: | 5.39 | 8.13 | 1.77 | 84.66 | — |
| Effluent: | 0.09 | 11.94 | 1.64 | 77.92 | 8.36 |

EXAMPLE 3

A reaction mixture containing the formaldehyde solution, acetone and sulfuric acid (0.09 wt.%) was charged into a stirred, tank reactor. The charge was rapidly heated to 165°C., kept at this temperature for 30 minutes and then cooled. The charge and the effluent were analyzed by gas chromatography. The results are summarized below in Table 3.

Table 3

| (wt.%) | Formaldehyde | Water | Methanol | Acetone | Methyl vinyl Ketone |
|---|---|---|---|---|---|
| Charge: | 5.51 | 7.91 | 1.71 | 84.78 | — |
| Effluent: | 1.32 | 13.16 | 1.46 | 78.30 | 5.74 |

EXAMPLE 4

A charge containing the formaldehyde solution, acetone and sulfuric acid was heated at 220°C. for 10 minutes in a pressure bomb. The results are summarized below in Table 4.

Table 4

| (wt.%) | Formaldehyde | Water | Methanol | Acetone | Sulfuric Acid | Methyl vinyl Ketone |
|---|---|---|---|---|---|---|
| Charge: | 5.19 | 57.95 | 2.23 | 34.33 | 0.29 | — |
| Effluent: | 0.84 | 63.18 | 2.41 | 27.75 | 0.29 | 5.52 |

EXAMPLE 5

Utilizing the procedure of Example 1, a charge containing the formaldehyde solution, acetone and 0.3 wt.% $H_2SO_4$ was reacted in a pressure bomb at 220°C. for 4 minutes. The results are summarized below in Table 5.

Table 5

| (wt.%) | Formaldehyde | Water | Methanol | Acetone | Methyl vinyl Ketone |
|---|---|---|---|---|---|
| Charge: | 5.96 | 7.92 | 1.53 | 84.57 | — |
| Effluent: | 0.06 | 13.25 | 1.41 | 76.1 | 9.1 |

EXAMPLE 6

A mixture of the formaldehyde solution, acetone and p-toluenesulfonic acid (pTSA) was pumped through a tube-type reactor of 290 ml. volume. This plug flow reactor was operated continuously for more than 100 hours at 10 ml./min. feed rate. The temperature and pressure in the reactor were kept constant at 225°C. and 800 psig. respectively. The feed solution and reactor effluent were analyzed by gas chromatography. The results are summarized below in Table 6.

Table 6

| | Formaldehyde | Water | Methanol | Acetone | Methyl Vinyl Acetone | Keto-butanol | pTSA | Others |
|---|---|---|---|---|---|---|---|---|
| Feed (wt.%) | 5.8 | 9.7 | 2.2 | 82.3 | — | — | 0.01 | — |
| Effluent (wt.%) | 0.33 | 11.6 | 1.84 | 74.0 | 7.72 | 2.06 | 0.01 | 2.45 |

I claim:

1. A process for obtaining methyl vinyl ketone comprising reacting at a temperature of from 100°C. to 300°C., a reaction mixture containing from about 5 to 20 parts by weight of acetone to 1 part by weight of formaldehyde and from about 0.01 to 0.5% by weight of the reaction mixture of a strong acid having a dissociation constant of $10^{-4}$ selected from the group consisting of sulfuric acid, an aliphatic, alicyclic or aromatic sulfonic acid, said reaction being carried out under a combination of temperatures and pressures sufficient to maintain the reaction mixture in a liquid phase.

2. The process of claim 1 wherein said acid is a sulfonic acid.

3. The process of claim 1 wherein said acid is p-toluene-sulfonic acid.

4. The process of claim 1 wherein said process is carried out at 150°C. to 250°C.

5. The process of claim 1 wherein 12 to 20 parts by weight of acetone are present in said liquid phase per part by weight of formaldehyde.

* * * * *

UNITED STATES PATENT OFFICE
CERTIFICATE OF CORRECTION

PATENT NO. : 3,928,457
DATED : December 23, 1975
INVENTOR(S) : GEORGE EMBER

It is certified that error appears in the above-identified patent and that said Letters Patent are hereby corrected as shown below:

Column 5, lines 36-38, Table 6,

"Methyl"
Vinyl
Acetone

Should be:

Methyl
Vinyl
Ketone

Signed and Sealed this

Seventeenth Day of August 1976

[SEAL]

Attest:

RUTH C. MASON
Attesting Officer

C. MARSHALL DANN
Commissioner of Patents and Trademarks